(12) United States Patent
Chan et al.

(10) Patent No.: US 8,552,607 B2
(45) Date of Patent: Oct. 8, 2013

(54) ELECTRIC POWER GENERATOR WITH FERROFLUID BEARINGS

(75) Inventors: Ho Yin Chan, Hong Kong (HK);
Francis Chee-Shuen Lee, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 460 days.

(21) Appl. No.: 12/901,530

(22) Filed: Oct. 10, 2010

(65) Prior Publication Data

US 2012/0086213 A1    Apr. 12, 2012

(51) Int. Cl.
*H02K 7/09*    (2006.01)

(52) U.S. Cl.
USPC ............................................ 310/90.5; 310/90

(58) Field of Classification Search
USPC ............ 310/154.06, 154.05, 154.08, 154.33, 310/154.36, 156.25, 156.32, 156.62, 310/156.64, 156.66, 268, 90, 90.5, 237; 290/44, 55
See application file for complete search history.

(56) References Cited

U.S. PATENT DOCUMENTS

| | | | | |
|---|---|---|---|---|
| 4,076,988 A * | 2/1978 | Litz | ................................. | 310/52 |
| 4,254,961 A * | 3/1981 | Fersht et al. | ................... | 277/410 |
| 4,350,896 A * | 9/1982 | Benoit | ............................. | 290/55 |
| 5,245,238 A * | 9/1993 | Lynch et al. | ................... | 310/116 |
| 5,334,899 A * | 8/1994 | Skybyk | ......................... | 310/268 |
| 5,455,472 A * | 10/1995 | Weiss et al. | ................... | 310/90.5 |
| 5,834,870 A * | 11/1998 | Tokushima et al. | .............. | 310/90 |
| 6,794,783 B2 * | 9/2004 | Tu et al. | .................... | 310/156.32 |
| 6,809,427 B2 * | 10/2004 | Cheung et al. | ................ | 290/1 R |
| 6,861,772 B2 * | 3/2005 | Cheung et al. | ................... | 310/30 |
| 6,977,025 B2 * | 12/2005 | McArdle et al. | ............ | 156/272.2 |
| 7,145,277 B2 | 12/2006 | Naito | | |
| 7,333,783 B2 | 2/2008 | Rode | | |
| 7,576,454 B2 | 8/2009 | Cheung | | |
| 2002/0109358 A1 * | 8/2002 | Roberts | ........................... | 290/54 |
| 2003/0030283 A1 * | 2/2003 | Lusk | .............................. | 290/44 |
| 2010/0283254 A1 * | 11/2010 | Richter et al. | ................... | 290/55 |

* cited by examiner

*Primary Examiner* — Tran Nguyen
*Assistant Examiner* — Naishadh Desai
(74) *Attorney, Agent, or Firm* — Ella Cheong Hong Kong; Margaret A. Burke; Sam T. Yip

(57) ABSTRACT

An electric generator using ferrofluid bearings is provided. The generator includes stators having plural magnets separated by a yoke of magnetizable materials. A rotor configured to rotate in a horizontal plane is positioned between the stators. The rotor includes plural coils in which current is induced during rotation from passing through the magnetic fields generated by the stators. A first set of ferrofluid bearings is positioned between the first stator and the rotor and a second set is positioned between the rotor and the second stator. A third set of ferrofluid bearings is positioned adjacent to the periphery of the rotor and configured to center the rotor. In one embodiment, the electric generator is wind-driven and supported in a wind collection housing.

20 Claims, 13 Drawing Sheets

ELECTRIC POWER GENERATOR WITH FERROFLUID BEARINGS

FIELD OF THE INVENTION

The invention relates to electric power generators in general and, more particularly to electric power generators that include ferrofluid bearings to permit smooth rotation.

BACKGROUND

Electric power generators are well-established devices in which mechanical energy is converted to electrical energy through the magnetoelectric effect. Electric current flows through a conductor when magnetic flux changes, typically by moving the conductor through a magnetic field. Various sources of mechanical energy for the required motion are commonly used such as steam (generated by fossil or nuclear fuel), water, compressed air, and wind. Typical electric generators have a rotating part known as the rotor, and a stationary part known as the stator. The conductors are in the form of conductor coils/windings and may be positioned on either the rotor or the stator. Similarly, the magnets that provide the magnetic field (either permanent magnets or electromagnets) may be positioned on either the rotor or the stator.

Because the rotor rotates relative to the stator, electric generators, as with many machines having rotating parts, use bearings between the relatively rotating parts. However, conventional ball bearings have high rotational torque at low rotational speeds and lower rotational torque at high rotational speeds. Frictional heat is generated that can degrade lubricants used with the ball bearings as well as degrading the bearings themselves. Further, at high rotational speeds, ball bearings can vibrate which causes problems at close design tolerances.

Thus there is a need in the art for improved electric generators having improved bearings to ensure smooth operation over a long operating lifetime.

SUMMARY OF THE INVENTION

The present invention uses ferrofluid bearings in a variety of configurations to ensure smooth relative rotation between one or more stators and one or more rotors. The invention also uses ferrofluid bearings to center the rotor in order to maintain proper alignment between the rotor(s) and the stator(s).

In one embodiment, the electric generator includes first and second stators, each stator including plural magnets separated by a yoke of magnetizable materials. The magnets are configured such that the direction of magnetization alternates between adjacent magnets whereby magnetic flux is concentrated in the magnetizable materials. In one embodiment the magnetic flux is directed substantially perpendicular to the plane of the stator. A rotor configured to rotate in a horizontal plane is positioned between the stators. The rotor includes plural coils in which current is induced during rotation from passing through the magnetic fields generated by the stators. A first set of ferrofluid bearings is positioned between the first stator and the rotor and a second set is positioned between the rotor and the second stator. A third set of ferrofluid bearings are positioned adjacent to the periphery of the rotor and configured to center the rotor. The rotor periphery can be the inner periphery or the outer periphery.

Alternatively, the magnets may be positioned on the rotor and the coils on the stator.

In one embodiment, the electric generator of the present invention is used with a wind collection apparatus to provide the mechanical energy required for electric power generation.

BRIEF DESCRIPTION OF THE DRAWINGS

FIG. 3A depicts upper ferrofluid bearing positions while

FIGS. 9A-9D depict plural configurations for the side ferrofluid bearings regarding placement along a rotor external periphery, internal periphery, or combinations of external and internal periphery.

DETAILED DESCRIPTION

Figure 1:
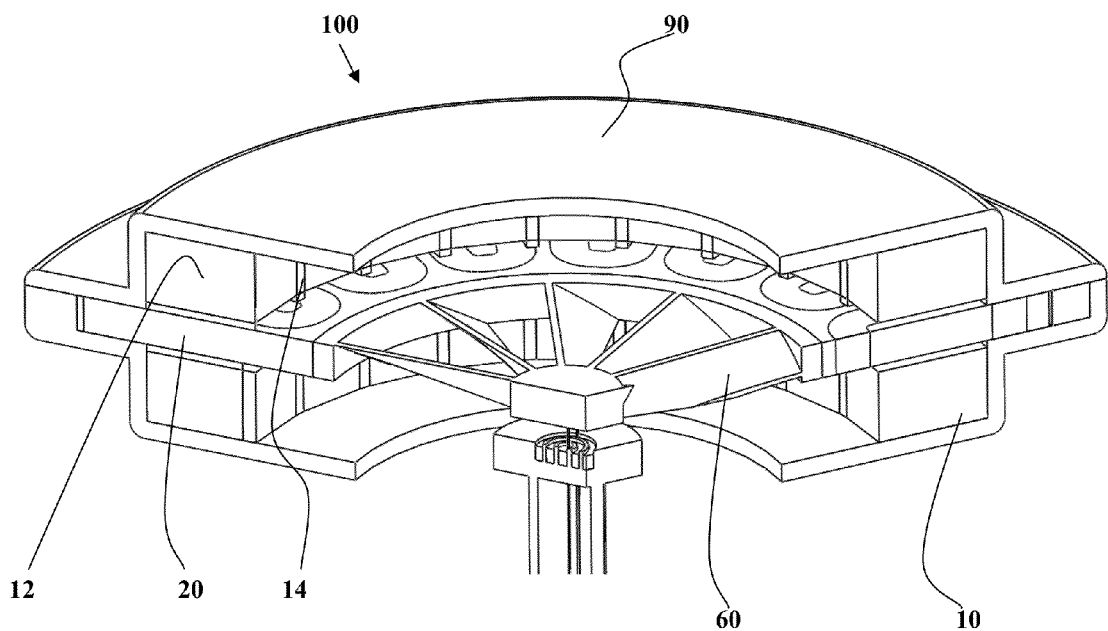
FIG. 1 is a perspective view in partial cross-section of an electric generator according to one embodiment of the present invention.

Turning to the drawings in detail, FIG. 1 depicts an electric generator 100 according to one embodiment of the present invention. Electric generator 100 includes stators 10 and rotor 20. Each stator 10 includes magnets 12 alternating with magnetizable materials 14 (best seen in FIG. 2) which function as a yoke for the magnets. The magnets are arranged with their magnetization directions in opposite directions for alternating magnets. In this way, the magnetic flux is directed and concentrated by the magnetizable materials 14 in a direction perpendicular the direction of rotation of the rotor.

Rotor 20 includes plural wire coils 22 in which current is induced during rotation from passing through the magnetic fields generated by the stators. The wire coils are embedded in a polymeric material 24 and, optionally, do not have a core to prevent formation of eddy currents. The rotor has a vertical axis and rotates in a horizontal plane in the various FIGS.

To enable relative motion between the rotor and the stators and to center the rotor, a variety of ferrofluid bearings are positioned in the electric generator 100. Ferrofluid bearings are based on ferrofluid materials. Ferrofluids are colloidal suspensions of magnetic or magnetizable particles such as iron oxide particles having a typical particle size between 30 and 150 angstroms. A surfactant (such as oleic acid, tetramethylammonium hydroxide, citric acid, and soy lecithin) adsorbs at one end to a particle and at the other end to a carrier fluid (typically a lubricant such as a synthetic hydrocarbon or a synthetic ester). This ensures separation of the particles even in the presence of a strong magnetic field. In the presence of a magnetic field, the ferrofluid moves to the region of highest magnetic flux and is contained in that region even in the case of high loads, thus bearings can be made from ferrofluids without the need for special containment seals.

Ferrofluid properties, such as viscosity and saturation magnetization, are determined by particle composition, particle size, particle concentration, and selection of the carrier fluid and the surfactant. For use in bearing applications, the higher the saturation magnetization, the greater the load that the ferrofluid bearing can support. For embodiments of the present invention, a saturation magnetization of approximately 50 mT to 60 mT is typically selected. To minimize sliding friction, a low viscosity carrier fluid is selected. For the embodiments of the present invention, typical viscosity values are less than 40 centipoise. Unlike mechanical bearings, ferrofluid bearing stiffness scales with rotation speed because of the hydrodynamic effect of the lubricant carrier liquid.

Ferrofluid materials are commercially available from Ferrotec Corporation (Nashua, N.H., USA).

Figure 3A:
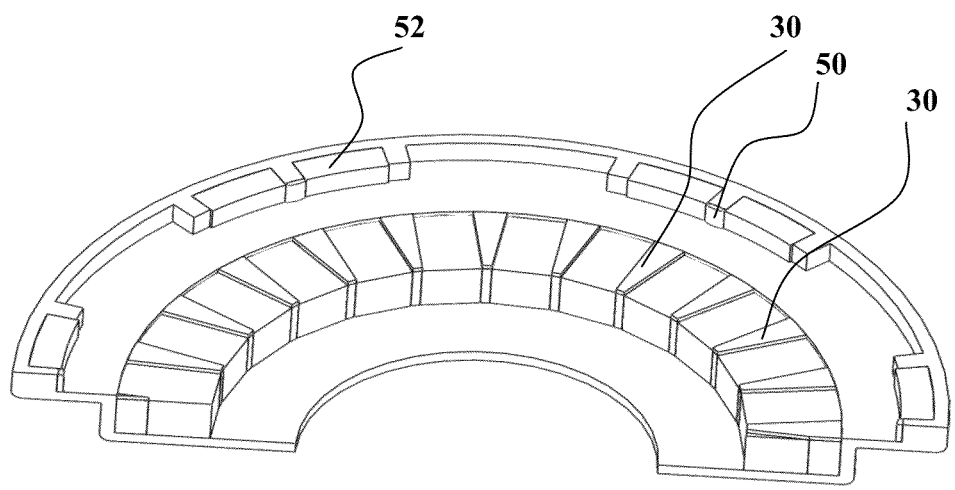
Figure 3B:
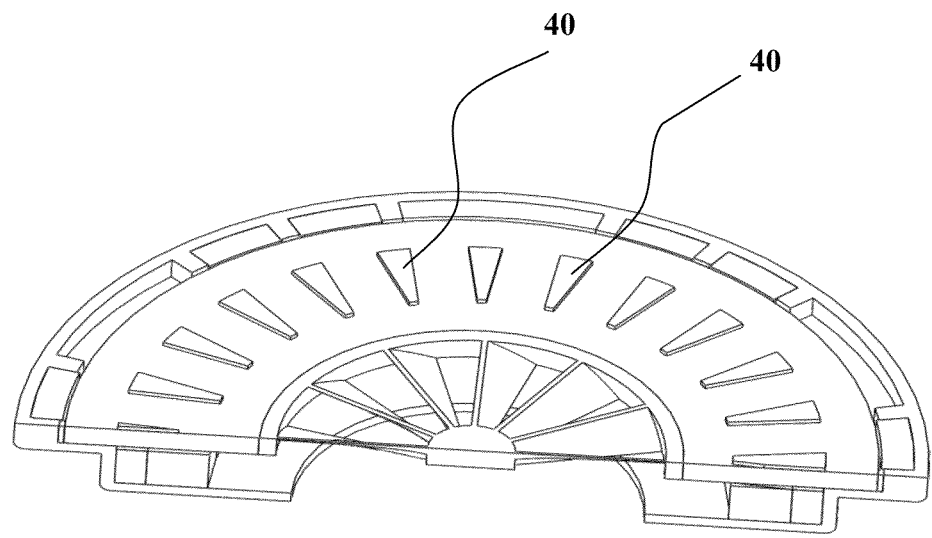
FIG. 3B depicts lower ferrofluid bearings and side ferrofluid bearings.

Because ferrofluids move to the region of highest magnetic flux, as seen in FIGS. 3A and 3B, ferrofluid bearings 30 and ferrofluid bearings 40 are attracted to the magnetizable yoke materials 14 where the flux is most densely concentrated for electric generator 100. Ferrofluid bearings 30 are positioned between the bottom stator and the rotor while ferrofluid bearings 40 are positioned between the rotor and the top stator. A third set of ferrofluid bearings 50 are positioned adjacent the periphery of the rotor (the rotor is not illustrated in FIG. 3B for clarity) to center the rotor, which is particularly useful for embodiments where the rotor does not have a central shaft.

Figure 4A:
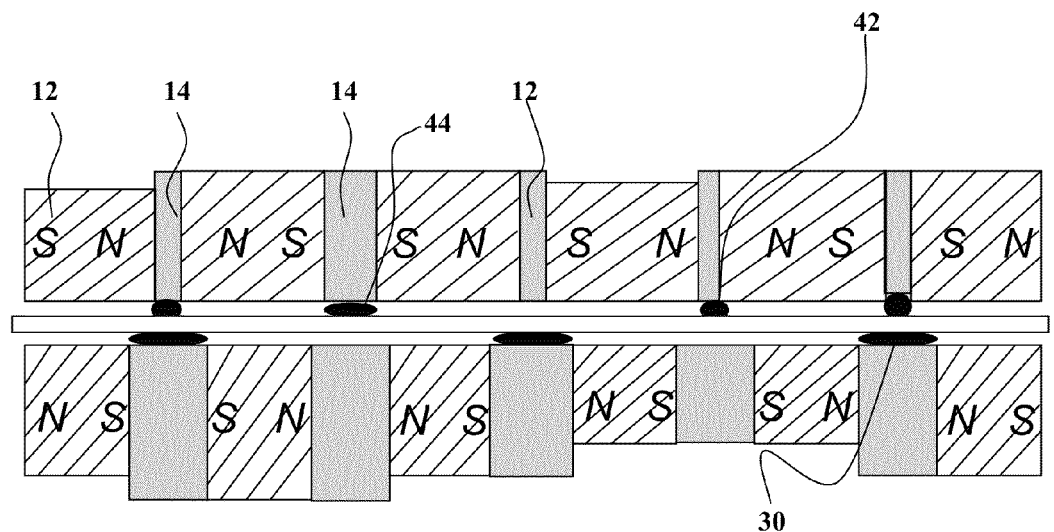
FIGS. 4A-4C depict flexible configurations for ferrofluid bearings to permit variations in bearing strength in side, cross-section and top views, respectively.
Figure 4B:
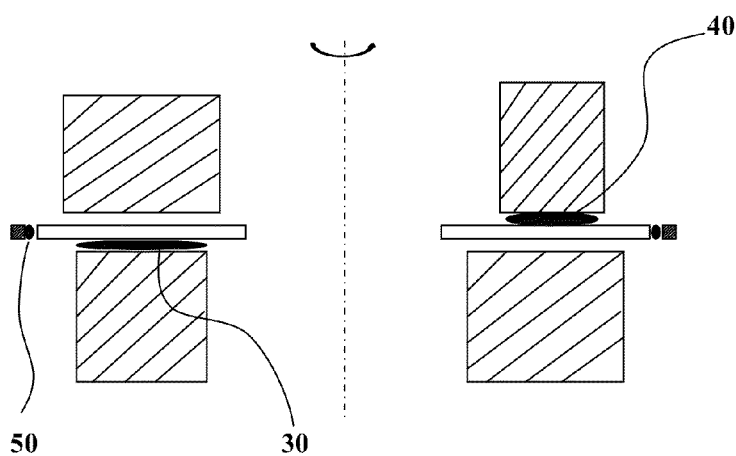
Figure 4C:
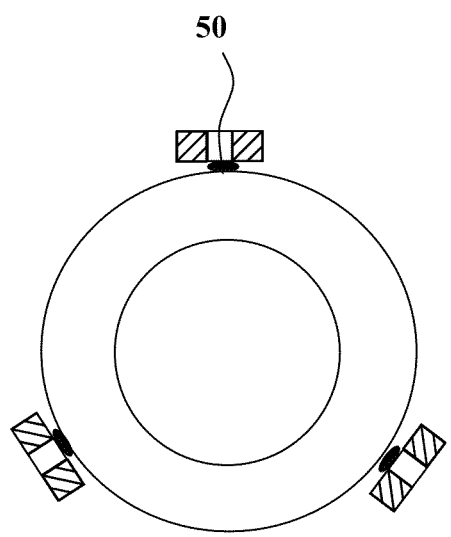

Depending upon the load-bearing requirements of the different sets of bearings 30, 40, and 50, the ferrofluid bearings are customized based on magnet 12 size and strength, magnetizable material 14 size, and selection of the components of the ferrofluid, as discussed above. FIG. 4A depicts various combinations of these factors to create sets of ferrofluid bearings with distinctly different properties. In the example of FIG. 4B, ferrofluid bearings 30 must support the weight of rotor 20 and thus are larger than ferrofluid bearings 40. Within any set of ferrofluid bearings 30, 40, or 50, individual bearings may have different properties. For example, in bearing set 40, individual bearings 42 and 44 have different sizes and shapes due to the selected size of magnetizable yoke materials 14, selected size of magnets 12, and selected volume of ferrofluid material.

Figure 10A:
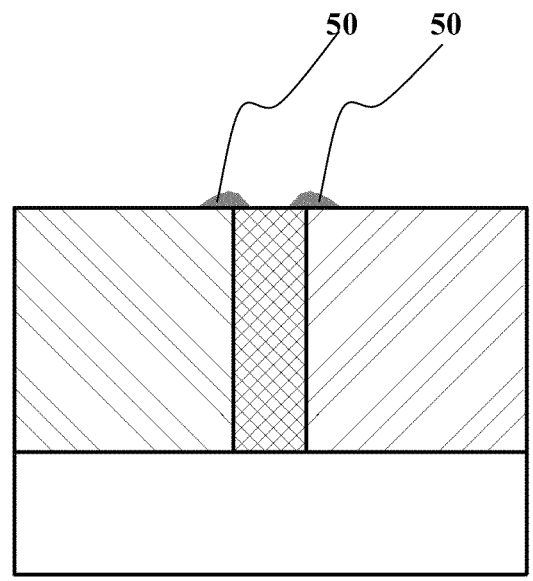
FIG. 10A-10B show configurations of ferrofluid bearings when small volumes of ferrofluid are used.
Figure 10B:
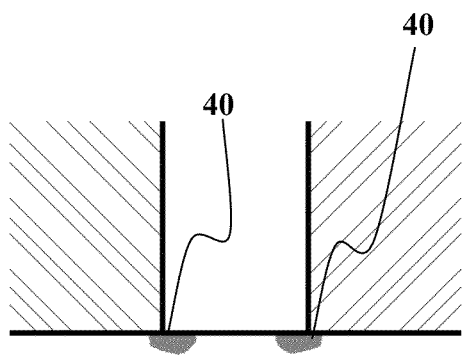
Figure 10B:
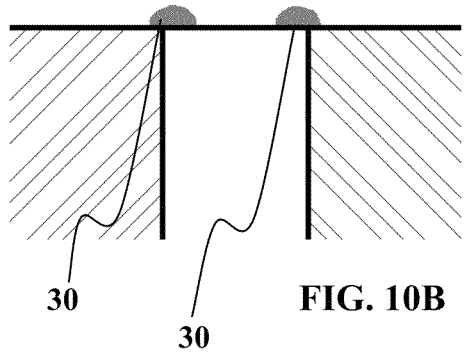
Figure 11A:
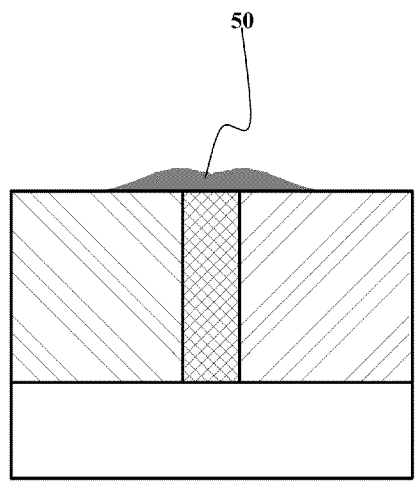
FIGS. 11A-11B show configurations of ferrofluid bearings when larger volumes of ferrofluid are used than the volumes of FIG. 10.
Figure 11B:
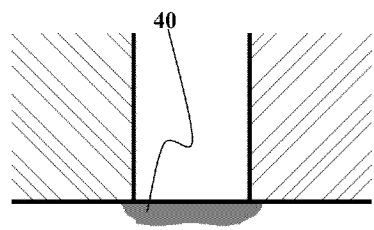
Figure 11B:
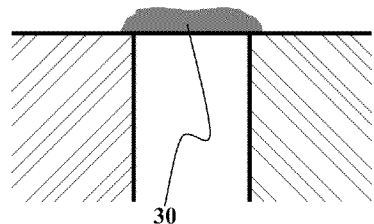

Depending on the volume of ferrofluid used, the ferrofluid bearings take on different configurations. For example, as seen in FIGS. 10A-10B ferrofluid bearings 30, 40 and 50 form plural rounded bearings at the edges of the yoke materials, adjacent the magnets. When a greater volume of ferrofluid is used, a continuous bearing is formed along the length of the yoke material, as seen in FIGS. 11A and 11B.

Figure 7:
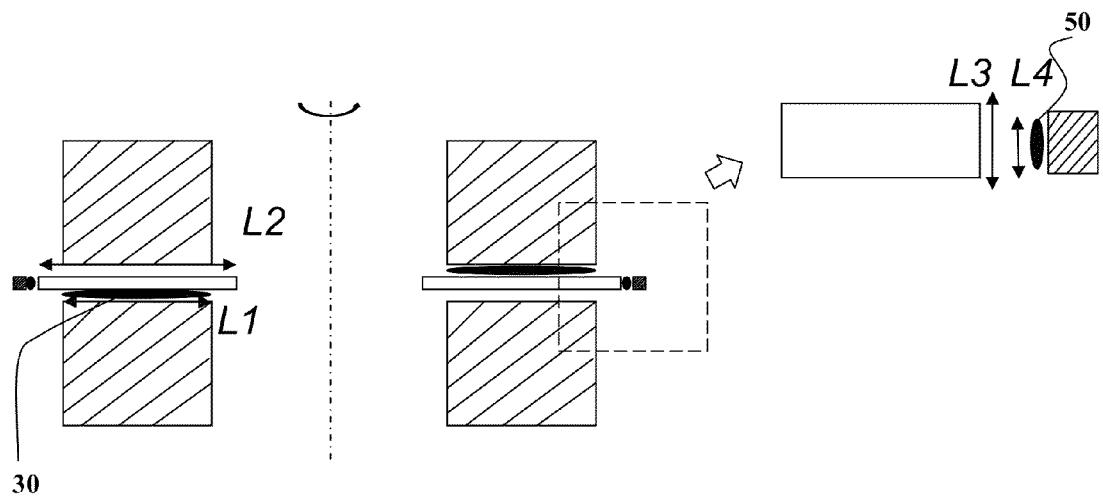
FIG. 7 shows design details for ferrofluid bearings regarding the length of the bearing and the length of the rotor for top and bottom bearings and side bearings.

As seen in FIG. 7, the length of the surface of the rotor 20 adjacent a ferrofluid bearing should be longer than the length of the bearing (30, 40) for improved bearing stiffness. Similarly, for side bearings, the thickness of the rotor should be greater than the length of the bearing 50.

Figure 2:
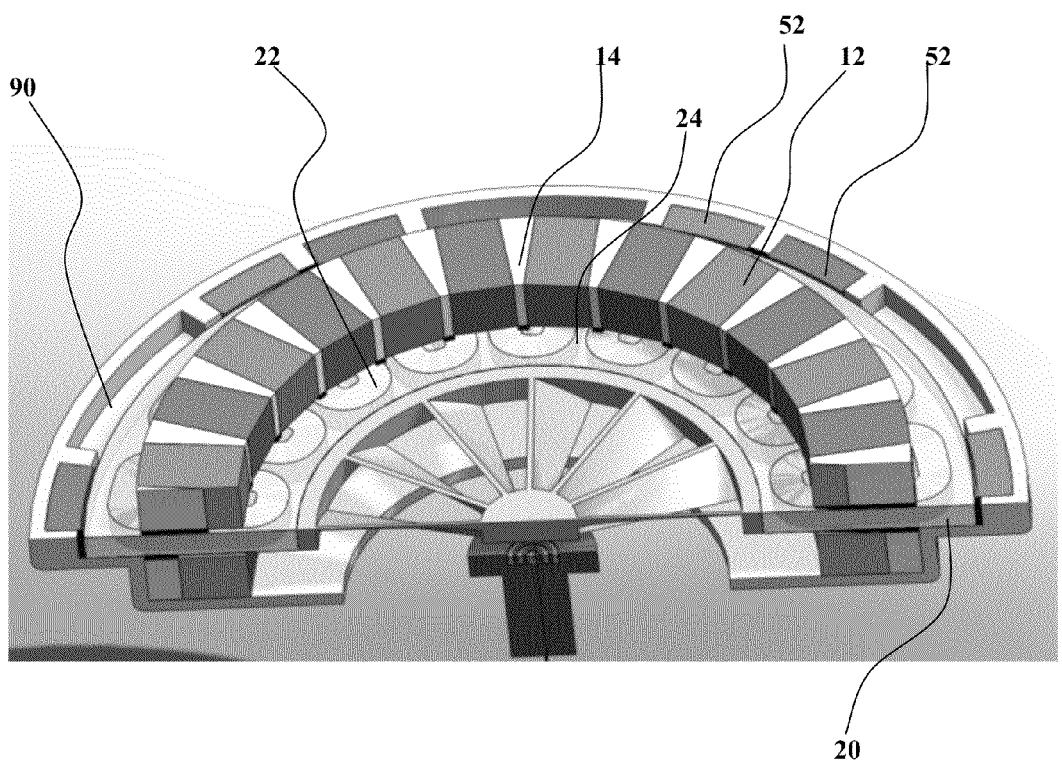
FIG. 2 is a top view of the electric generator of FIG. 1.
Figure 5A:
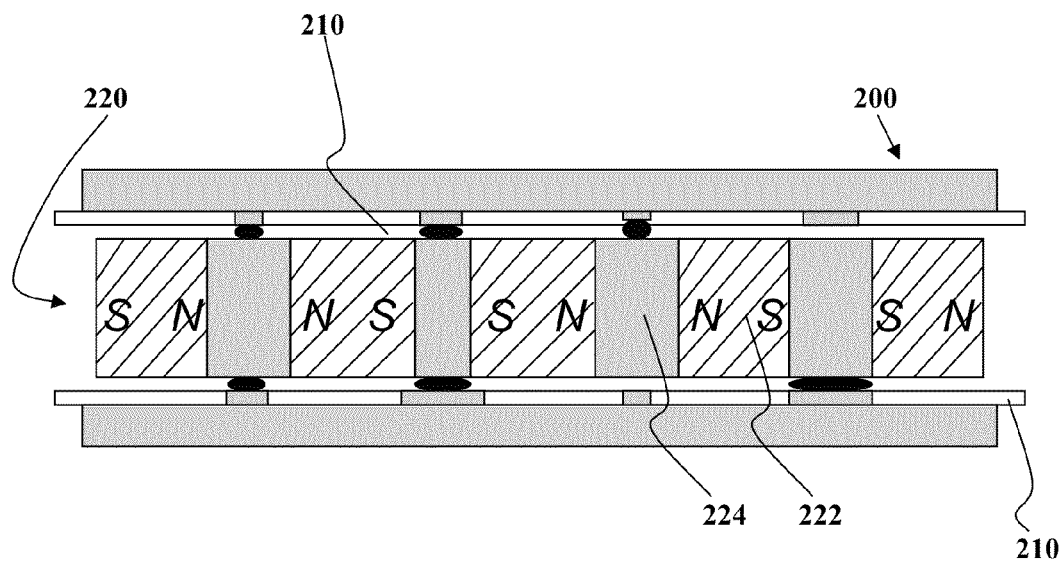
FIGS. 5A-5B depict an electric generator with magnets positioned on the rotor and coils positioned on the stators in side and cross-section views, respectively.
Figure 5B:
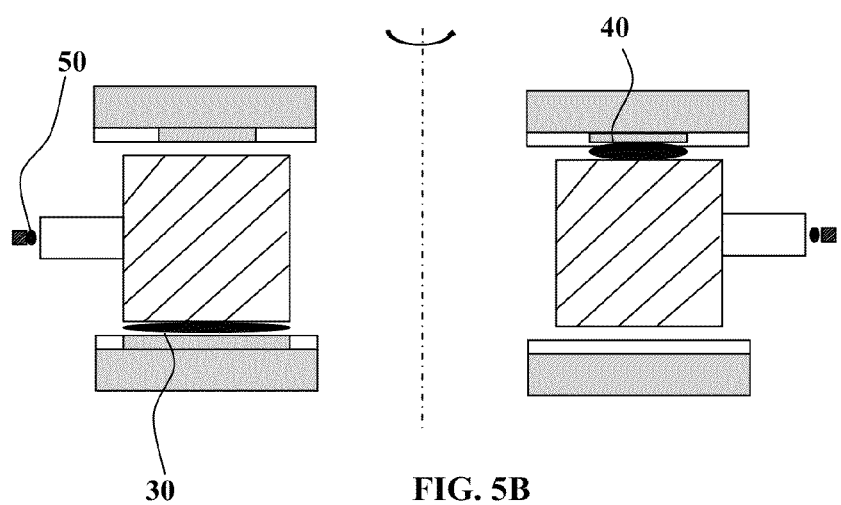
Figure 6A:
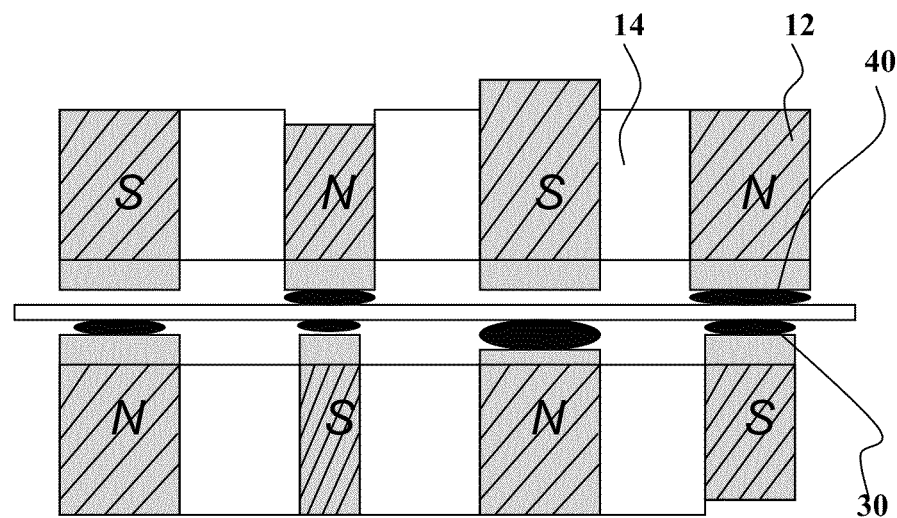
FIGS. 6A-6B depict flexible magnet configurations to produce magnetization in a radial direction with respect to the rotor rotation direction in side and cross-section views, respectively.
Figure 6B:
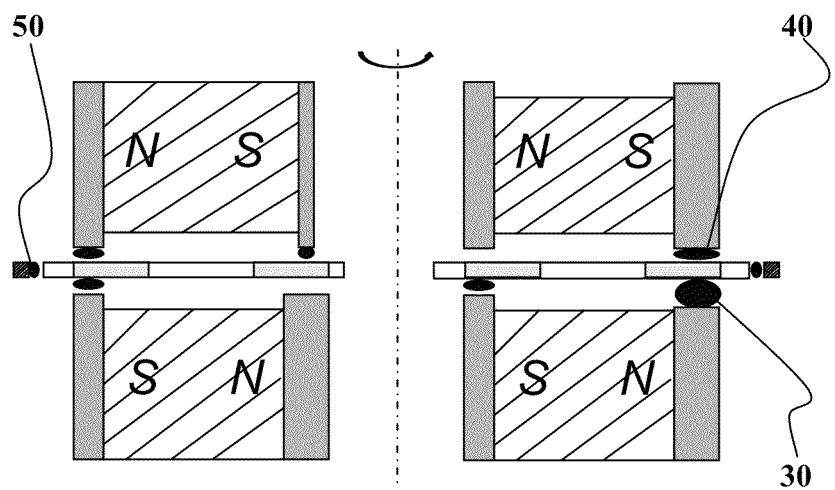

Although the embodiment of FIGS. 1 and 2 uses magnets positioned on the stators and coil positioned on the rotor, the magnets may alternatively be positioned on the rotor while the coils are positioned on the stators. Such an embodiment is depicted in FIG. 5 where generator 200 includes coils on stators 210 and magnets 222 and magnetizable materials 224 on rotor 220.

Figure 9A:
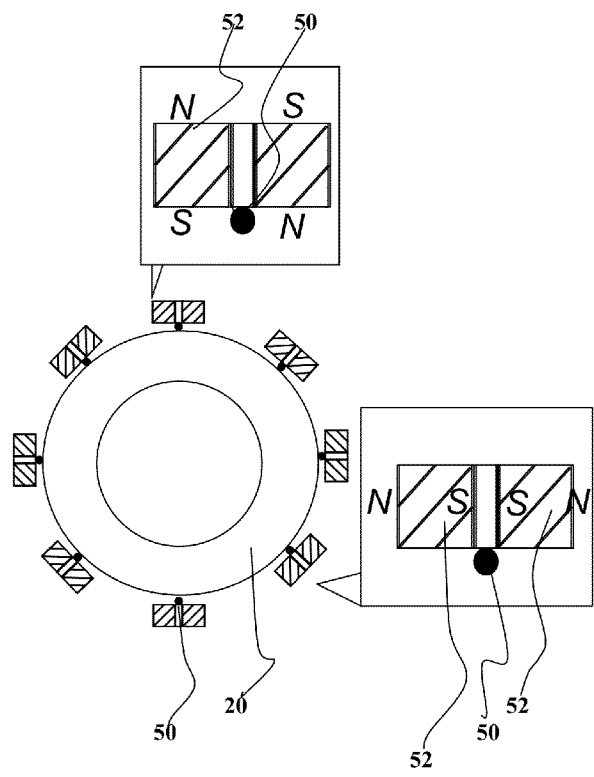
Figure 9B:
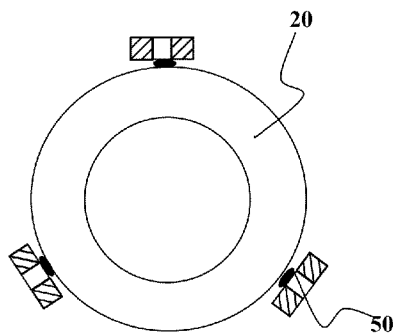
Figure 9C:
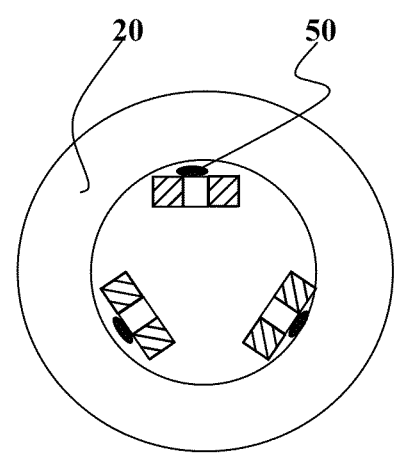

A lightweight dielectric housing 90 holds electric generator 100 and also houses magnets 52 for side ferrofluid bearings 50 (best seen in FIG. 2). As seen in FIG. 9A the magnetization direction of the magnets for the side ferrofluid bearings 50 is not limited as long as the selected configuration results in a high magnetic flux density in the region where the ferrofluid is to be positioned. Thus the polarity of magnets 52 in FIG. 9A may be in various directions, as shown. Further, for the side bearings 50, a number of configurations can be used to center the rotor using bearings positioned on the outer periphery of the rotor 20 (9A and 9B), on the inner periphery of rotor 20 (9C) or a combination of outer periphery and inner periphery (9D).

In one embodiment of the present invention, the electric generator 100 has mechanical energy imparted to it by wind force. To cause the rotor to rotate and generate electricity, wind drives fan blades 60 (FIGS. 1, 2). In the embodiment of FIGS. 1 and 2, the generator is configured for wind directed from the bottom of the generator towards the top of the generator. In this embodiment, the bearing set 40 resists up thrust from upward forces. Electricity from the coils 22 is collected via wires embedded or attached to fan blades 60.

Figure 8:
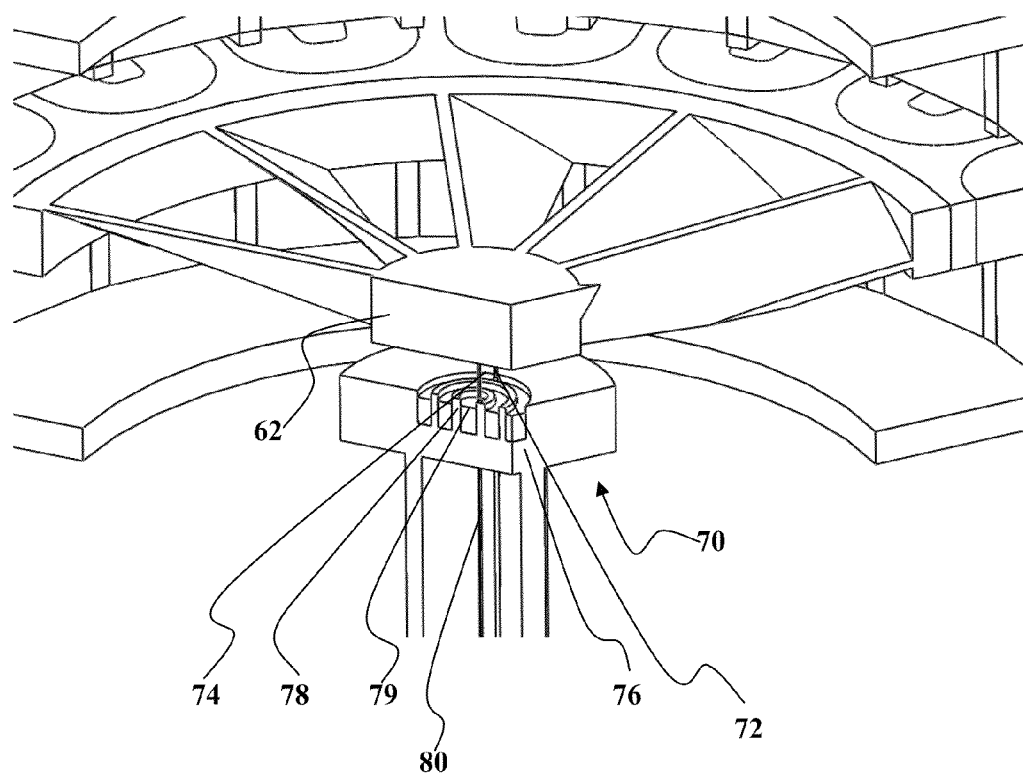
FIG. 8 depicts electrical connectors for collecting generated electricity.

As seen in FIG. 8, an electrical connector 70 is provided to transfer electricity from all of the coils to a central collection cable 80. When the stator elements are magnets and the rotor includes the coils, connector 70 includes one or more leads 72, 74 that extend from a fan blade center 62 to a receptacle 76 including circular tracks 78 holding liquid metal 79 (e.g., gallium, gallium alloy). During rotation, leads 72, 74 rotate within the tracks and transfer the generated electricity to the liquid metal 79. Collection cable 80 is also electrically connected to the liquid metal; thus the generated electricity passes along the collection cable towards a destination point where the electricity will be used. Alternatively, when the stator elements include coils and the rotor element includes magnets, current generated in the coils is routed via wires or other electrical connectors in the stators to collection cable 80.

In one embodiment, the electric generator of the present invention is housed in a wind collection apparatus. The wind collection apparatus is an omnidirectional wind collector which concentrates and accelerates wind from an inlet and sends the wind upward through fan blades 60 to cause rotation of the rotor. Further details of the wind collection apparatus are disclosed in US20120086212, the disclosure of which is incorporated by reference herein. However, it is understood that the electric generator of the present invention can use other forms of mechanical energy to drive the rotor such as steam power and water power.

While the foregoing invention has been described with respect to various embodiments, such embodiments are not limiting. Numerous variations and modifications would be understood by those of ordinary skill in the art. Such variations and modifications are considered to be included within the scope of the following claims.

What is claimed is:
1. An electric generator comprising:
first and second stators, each stator including a plurality of magnets separated by a plurality of magnetizable materials, the magnets configured such that the direction of magnetization alternates between adjacent magnets whereby magnetic flux is concentrated in the magnetizable materials;
a rotor positioned between the first and second stators and configured to rotate in a horizontal plane, the rotor hav- ing a plurality of coils in which current is induced during rotation from passing through magnetic fields generated by the stators;

a first set of ferrofluid bearings positioned between the first stator and the rotor;

a second set of ferrofluid bearings positioned between the rotor and the second stator;

a third set of ferrofluid bearings positioned adjacent the periphery of the rotor and configured to center the rotor: and an electrical connector positioned substantially at the center of the rotor for making electrical contact with a receptacle holding a liquid metal positioned adjacent the electrical connector.

2. The electric generator according to claim 1 wherein the magnets are configured such that the magnetic flux is concentrated in the magnetizable materials in a direction substantially perpendicular to the plane of the stator.

3. The electric generator according to claim 1 further comprising fan blades positioned in the center of the rotor and configured to be rotated by wind.

4. The electric generator according to claim 1 wherein each of the first, second, and third sets of ferrofluid bearings has different properties from each other.

5. The electric generator according to claim 4 wherein the different properties are selected from one or more of bearing stiffness, ferrofluid viscosity, ferrofluid saturation magnetization, ferrofluid particle size, ferrofluid particle composition, ferrofluid carrier fluid composition, ferrofluid volume, bearing size, and bearing shape.

6. The electric generator according to claim 1 wherein the length of a surface of the rotor adjacent an individual ferrofluid bearing of the first or second or third set of ferrofluid bearings is longer than the length of the individual bearing.

7. The electrical generator according to claim 3 further comprising wires embedded in the fan blades for transporting electricity from the coils to the electrical connector.

8. An electric generator comprising:

first and second stators, each stator including a plurality of coils in which current is induced during rotation from passing magnetic fields;

a rotor positioned between the first and second stators and configured to rotate in a horizontal plane, the rotor having a plurality of magnets separated by a plurality of magnetizable materials, the magnets configured such that the direction of magnetization alternates between adjacent magnets whereby magnetic flux is concentrated in the magnetizable materials;

a first set of ferrofluid bearings positioned between the first stator and the rotor and configured to support the rotor's weight;

a second set of ferrofluid bearings positioned between the rotor and the second stator and configured to resist up thrust from upward forces on the rotor; and a third set of ferrofluid bearings positioned adjacent the periphery of the rotor and configured to center the rotor.

9. The electric generator according to claim 8 wherein the magnets are configured such that the magnetic flux is concentrated in the magnetizable materials in a direction substantially perpendicular to the plane of the rotor.

10. The electric generator according to claim 8 further comprising fan blades positioned in the center of the rotor and configured to be rotated by wind.

11. The electric generator according to claim 8 further comprising an electrical connector positioned at the stators for electrical contact.

12. The electric generator according to claim 8 wherein each of the first, second, and third sets of ferrofluid bearings has different properties from each other.

13. The electric generator according to claim 12 wherein the different properties are selected from one or more of bearing stiffness, ferrofluid viscosity, ferrofluid saturation magnetization, ferrofluid particle size, ferrofluid particle composition, ferrofluid carrier fluid composition, ferrofluid volume, bearing size, and bearing shape.

14. A wind collection apparatus including the electric generator of claim 1.

15. A wind collection apparatus including the electric generator of claim 8.

16. The electrical generator according to claim 1 wherein the third set of ferrofluid bearings positioned adjacent the periphery of the rotor and configured to center the rotor are positioned adjacent an external periphery of the rotor, an internal periphery of the rotor, or a combination of an external periphery of the rotor and an internal periphery of the rotor.

17. The electrical generator according to claim 8 wherein the third set of ferrofluid bearings positioned adjacent the periphery of the rotor and configured to center the rotor are positioned adjacent an external periphery of the rotor, an internal periphery of the rotor, or a combination of an external periphery of the rotor and an internal periphery of the rotor.

18. The electrical generator according to claim 1 wherein the shape of any individual ferrofluid bearing in any of the first, second, or third sets of ferrofluid bearings is controlled by a selected volume of ferrofluid material used to create that individual ferrofluid bearing.

19. The electric generator according to claim 8, wherein:

a surface of the rotor adjacent to a first individual ferrofluid bearing in the first set of ferrofluid bearings has a length longer than a length of the first individual ferrofluid bearing so as to promote bearing stiffness of the first set of ferrofluid bearings, thereby enabling the first set of ferrofluid bearings to be configured to support the rotor's weight;

a surface of the rotor adjacent to a second individual ferrofluid bearing in the second set of ferrofluid bearings has a length longer than a length of the second individual ferrofluid bearing so as to promote bearing stiffness of the second set of ferrofluid bearings, thereby enabling the second set of ferrofluid bearings to be configured to resist the up thrust; and the rotor has a thickness greater than a length of a third individual ferrofluid bearing in the third set of ferrofluid bearings so as to promote bearing stiffness of the third set of ferrofluid bearings, thereby enabling the third set of ferrofluid bearings to be configured to center the rotor.

20. The electrical generator according to claim 8 wherein the shape of any individual ferrofluid bearing in any of the first, second, or third sets of ferrofluid bearings is controlled by a selected volume of ferrofluid material used to create that individual ferrofluid bearing.

* * * * *